US012688093B1

(12) United States Patent
Shaik et al.

(10) Patent No.: US 12,688,093 B1
(45) Date of Patent: *Jul. 21, 2026

(54) MONITORING AUTOMATED VIRTUAL MACHINE RECLAMATION

(71) Applicant: United Services Automobile Association (USAA), San Antonio, TX (US)

(72) Inventors: Ahmad Ali Shaik, Austin, TX (US); Arturo Zuniga, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 3 days.

This patent is subject to a terminal disclaimer.

(21) Appl. No.: 19/056,926

(22) Filed: Feb. 19, 2025

Related U.S. Application Data

(63) Continuation of application No. 18/362,350, filed on Jul. 31, 2023, now Pat. No. 12,259,787.

(51) Int. Cl.
| | |
|---|---|
| *G06F 11/00* | (2006.01) |
| *G06F 11/07* | (2006.01) |
| *G06F 11/14* | (2006.01) |
| *G06F 11/1471* | (2026.01) |

(52) U.S. Cl.
CPC ........ *G06F 11/1435* (2013.01); *G06F 11/079* (2013.01); *G06F 11/1471* (2013.01)

(58) Field of Classification Search
CPC . G06F 11/1435; G06F 11/079; G06F 11/1471
See application file for complete search history.

(56) References Cited

U.S. PATENT DOCUMENTS

| | | | |
|---|---|---|---|
| 8,219,769 | B1 | 7/2012 | Wilk |
| 8,479,194 | B2 | 7/2013 | Rangegowda et al. |
| 10,067,692 | B2 * | 9/2018 | Liu ...................... G06F 3/0664 |
| 10,379,922 | B1 | 8/2019 | Bell et al. |
| 11,621,882 | B1 | 4/2023 | Wilkinson et al. |
| 11,740,969 | B2 | 8/2023 | Moorthy |
| 2006/0188011 | A1 | 8/2006 | Goldszmidt et al. |
| 2009/0313620 | A1 | 12/2009 | Sedukhin et al. |
| 2012/0311341 | A1 | 12/2012 | Paris et al. |
| 2014/0165060 | A1 | 6/2014 | Muller et al. |
| 2014/0245423 | A1 | 8/2014 | Lee |

(Continued)

*Primary Examiner* — Jason B Bryan
(74) *Attorney, Agent, or Firm* — Potomac Law Group, PLLC; Dannon G. Allbee

(57) ABSTRACT

Aspects of the present disclosure provide a monitoring algorithm that ensures that each step of an automated virtual machine reclamation process executes correctly before moving on to the next step. After each step of the process, some implementations can determine whether the resulting data is correct. If the resulting data is incorrect, some implementations can initially revert any fields updated by the process to their correct value. Some implementations can further decide whether to resubmit the virtual machine for reclamation automatically, or queue it for manual review based on, for example, multiple or repeated failures, server or data center failures, etc. Thus, some implementations can not only automate each step of the reclamation process, but also provide process evaluation and error detection for the reclamation process.

20 Claims, 13 Drawing Sheets

(56)                    References Cited

U.S. PATENT DOCUMENTS

| | | | |
|---|---|---|---|
| 2015/0089272 A1* | 3/2015 | Nelson | G06F 9/45533 |
| | | | 714/4.1 |
| 2016/0196158 A1 | 7/2016 | Nipane et al. | |
| 2016/0261523 A1 | 9/2016 | Razack et al. | |
| 2017/0083359 A1 | 3/2017 | Suzuki et al. | |
| 2017/0147690 A1 | 5/2017 | Mastrio | |
| 2017/0364404 A1 | 12/2017 | Yang et al. | |
| 2019/0372900 A1 | 12/2019 | Chen et al. | |
| 2020/0034169 A1 | 1/2020 | Deore et al. | |
| 2021/0019406 A1 | 1/2021 | Chistyakov et al. | |
| 2021/0181739 A1 | 6/2021 | Chen et al. | |
| 2022/0141224 A1 | 5/2022 | Pulsifer et al. | |
| 2023/0120629 A1 | 4/2023 | Cui et al. | |
| 2023/0294620 A1 | 9/2023 | Lowe et al. | |

* cited by examiner

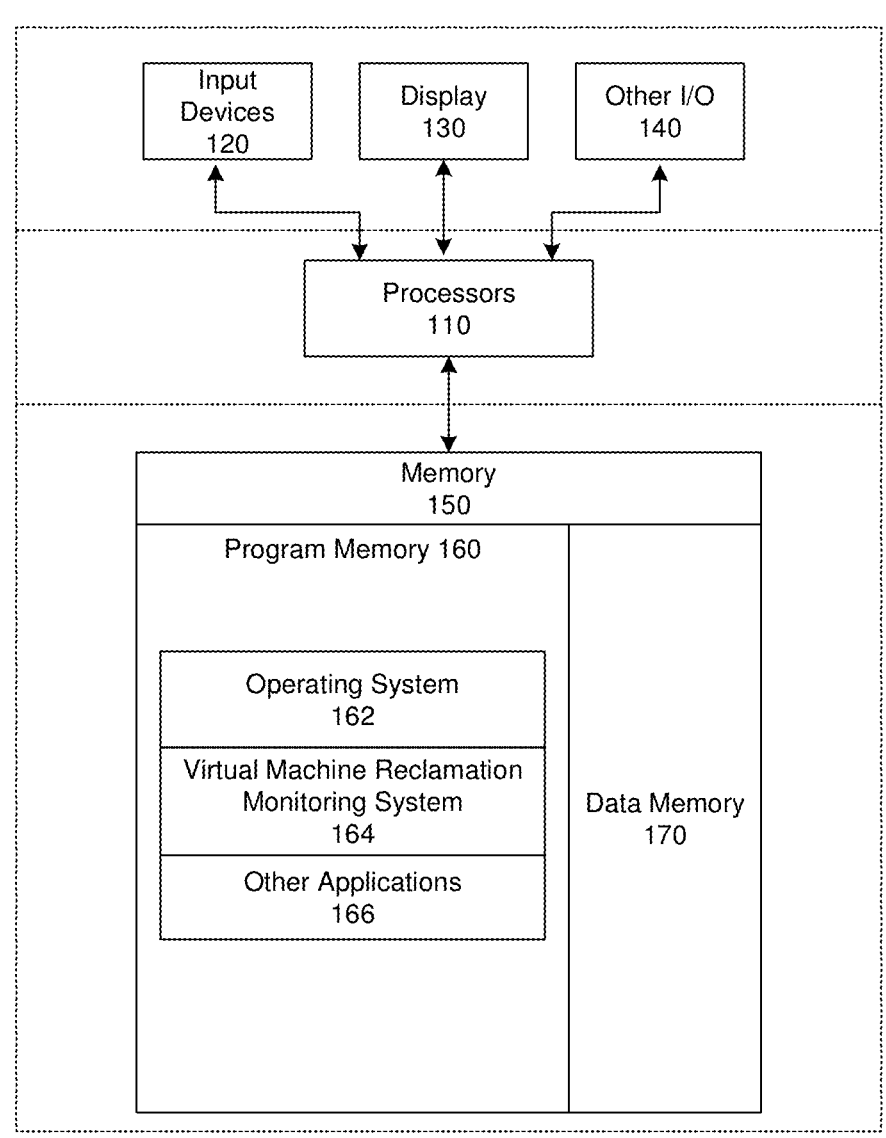
FIG. 1

400

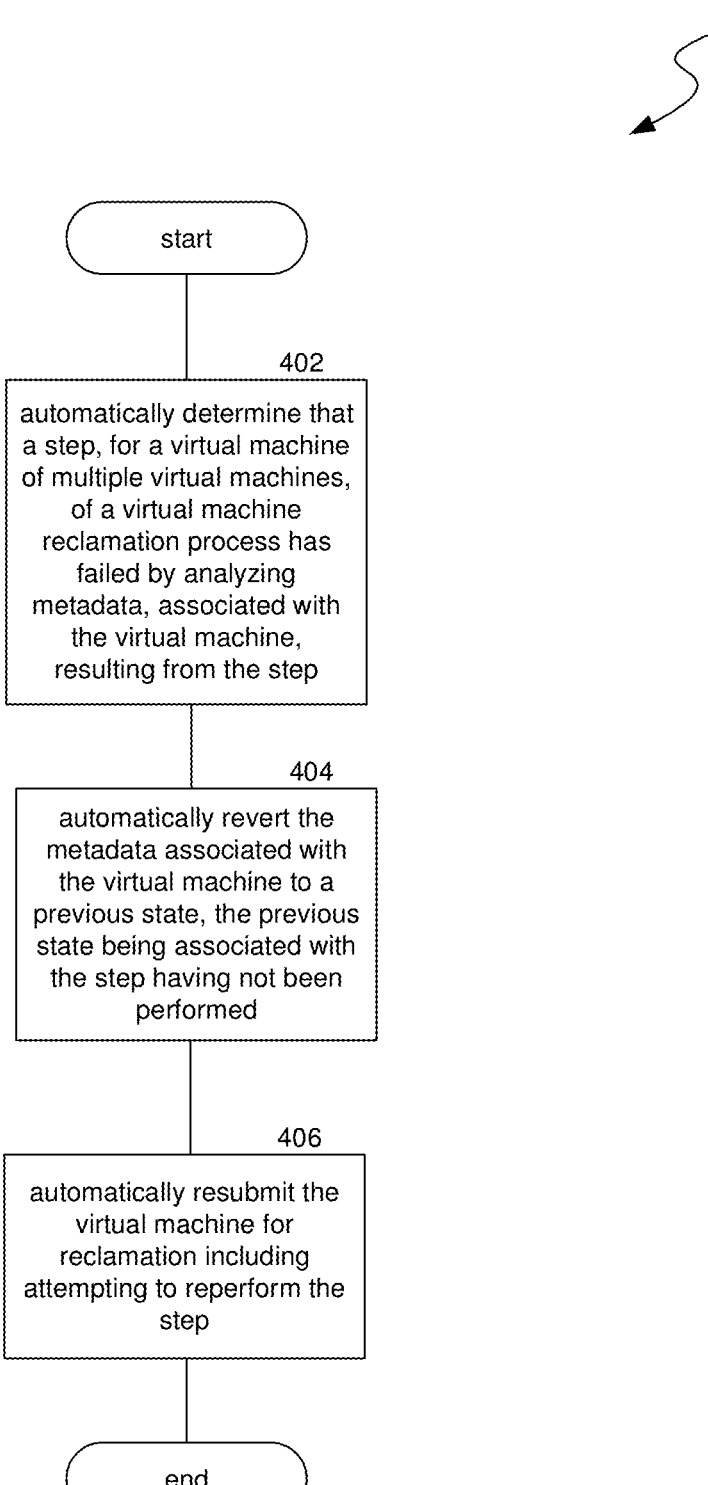

start

402 automatically determine that a step, for a virtual machine of multiple virtual machines, of a virtual machine reclamation process has failed by analyzing metadata, associated with the virtual machine, resulting from the step

404 automatically revert the metadata associated with the virtual machine to a previous state, the previous state being associated with the step having not been performed

406 automatically resubmit the virtual machine for reclamation including attempting to reperform the step end

| Virtual Machine | Owner | Assigment State | Maintenance Mode | Delivery Group | TYPE |
|---|---|---|---|---|---|
| VM01A001 | AU-0001 | 1 | 0 | SALES_Team1_LOC_01 | A |
| VM01A002 | AU-A002 | 1 | 0 | STAFF_TeamA_LOC_22 | A |
| VM01A003 | AU-B098 | 1 | 0 | 3P_Team1_LOC_A01 | A |
| VM01A004 | AU-0004 | 1 | 0 | LEGAL_TeamA_LOC_22 | A |
| VM01A005 | AU-0965 | 1 | 0 | BANK_Team1_LOC_S4 | A |
| VM01A006 | AU-789A | 1 | 0 | INS_TeamA_LOC_22 | A |
| VM01A007 | AU-9097 | 1 | 0 | LIFE_Team1_LOC_A01 | A |
| VM01A008 | AU-AAA1 | 1 | 0 | IT_TeamA_LOC_22 | A |
| VM01A009 | AU-XA01 | 1 | 0 | HR_TeamA_LOC_22 | A |

608    602    604    606    610    612

| Virtual Machine | Owner | Assigment State | Maintenance Mode | Delivery Group | TYPE |
|---|---|---|---|---|---|
| VM01A001 | AU-0001 | 1 | 1 | REMOVE_SALES_Team1_LOC_01 | A |
| VM01A002 | AU-A0R2 | 1 | 1 | REMOVE_STAFF_TeamA_LOC_22 | A |
| VM01A003 | AU-B038 | 1 | 1 | REMOVE_3P_Team1_LOC_A01 | A |
| VM01A004 | AU-0084 | 1 | 1 | REMOVE_LEGAL_TeamA_LOC_22 | A |
| VM01A005 | AU-0965 | 1 | 1 | REMOVE_BANK_Team1_LOC_54 | A |
| VM01A006 | AU-789A | 1 | 1 | REMOVE_INS_TeamA_LOC_22 | A |
| VM01A007 | AU-9097 | 1 | 1 | REMOVE_LIFE_Team1_LOC_A01 | A |
| VM01A008 | AU-AAA1 | 1 | 1 | REMOVE_IT_TeamA_LOC_22 | A |
| VM01A009 | AU-XA01 | 1 | 0 | REMOVE_HR_TeamA_LOC_22 | A |

| Virtual Machine | Owner | Assignment State | Maintenance Mode | Delivery Group | TYPE |
|---|---|---|---|---|---|
| VM01A001 | AU-0001 | 1 | 1 | REMOVE_SALES_Team1_LOC_01 | A |
| VM01A002 | AU-A002 | 1 | 1 | REMOVE_STAFF_TeamA_LOC_22 | A |
| VM01A003 | AU-B038 | 1 | 1 | REMOVE_3P_Team1_LOC_A01 | A |
| VM01A004 | AU-0004 | 1 | 1 | REMOVE_LEGAL_TeamA_LOC_22 | A |
| VM01A005 | AU-0965 | 1 | 1 | REMOVE_BANK_Team1_LOC_54 | A |
| VM01A006 | AU-789A | 1 | 1 | REMOVE_INS_TeamA_LOC_22 | A |
| VM01A007 | AU-9097 | 1 | 1 | REMOVE_LIFE_Team1_LOC_A01 | A |
| VM01A008 | AU-AAA1 | 1 | 1 | REMOVE_IT_TeamA_LOC_22 | A |
| VM01A009 | AU-XA01 | 1 | 0 | HR_TeamA_LOC_22 | A |

608    602    610    604    612    606

600C

700A

| Virtual Machine | Owner | Assignment State | Maintenance Mode | Delivery Group | TYPE |
|---|---|---|---|---|---|
| VM01A001 | AU-X001 | 1 | 1 | REMOVE_SALES_Team1_LOC_01 | A |
| VM01A002 | AU-A002 | 1 | 1 | REMOVE_STAFF_TeamA_LOC_22 | A |
| VM01A003 | AU-B036 | 1 | 1 | REMOVE_3P_Team1_LOC_A01 | A |
| VM01A004 | AU-D004 | 1 | 1 | REMOVE_LEGAL_TeamA_LOC_22 | A |
| VM01A005 | AU-D965 | 1 | 1 | REMOVE_BANK_Team1_LOC_54 | A |
| VM01A006 | AU-7A9A | 1 | 1 | REMOVE_INS_TeamA_LOC_22 | A |
| VM01A007 | AU-9D97 | 1 | 1 | REMOVE_LIFE_Team1_LOC_A01 | A |
| VM01A008 | AU-AAA1 | 1 | 1 | REMOVE_IT_TeamA_LOC_22 | A |
| VM01A009 | AU-XA01 | 1 | 1 | REMOVE_HR_TeamA_LOC_22 | A |

708   710   712

702   704   706

700B

| Virtual Machine | Owner | Assignment State | Maintenance Mode | Delivery Group | TYPE |
|---|---|---|---|---|---|
| VM01A001 | NULL | 0 | 1 | REMOVE_SALES_Team1_LOC_01 | A |
| VM01A002 | NULL | 0 | 1 | REMOVE_STAFF_TeamA_LOC_22 | A |
| VM01A003 | NULL | 0 | 1 | REMOVE_3P_Team1_LOC_A01 | A |
| VM01A004 | NULL | 0 | 1 | REMOVE_LEGAL_TeamA_LOC_22 | A |
| VM01A005 | NULL | 0 | 1 | REMOVE_BANK_Team1_LOC_54 | A |
| VM01A006 | NULL | 0 | 1 | REMOVE_INS_TeamA_LOC_22 | A |
| VM01A007 | NULL | 0 | 1 | REMOVE_LIFE_Team1_LOC_A01 | A |
| VM01A008 | NULL | 0 | 1 | REMOVE_IT_TeamA_LOC_22 | A |
| VM01A009 | AU-XA01 | 0 | 1 | REMOVE_HR_TeamA_LOC_23 | A |

708  710  712

702  704  706

700C

| Virtual Machine | Owner | Assigment State | Maintenance Mode | Delivery Group | TYPE |
|---|---|---|---|---|---|
| VM01A001 | NULL | 0 | 1 | REMOVE_SALES_Team1_LOC_01 | A |
| VM01A002 | NULL | 0 | 1 | REMOVE_STAFF_TeamA_LOC_22 | A |
| VM01A003 | NULL | 0 | 1 | REMOVE_3P_Team1_LOC_A01 | A |
| VM01A004 | NULL | 0 | 1 | REMOVE_LEGAL_TeamA_LOC_22 | A |
| VM01A005 | NULL | 0 | 1 | REMOVE_BANK_Team1_LOC_54 | A |
| VM01A006 | NULL | 0 | 1 | REMOVE_IRS_TeamA_LOC_22 | A |
| VM01A007 | NULL | 0 | 1 | REMOVE_LIFE_Team1_LOC_A01 | A |
| VM01A008 | NULL | 0 | 1 | REMOVE_IT_TeamA_LOC_22 | A |
| VM01A009 | AU-XA01 | 1 | 1 | REMOVE_HR_TeamA_LOC_22 | A |

708    710    712

702    704    706

MONITORING AUTOMATED VIRTUAL MACHINE RECLAMATION

CROSS-REFERENCE TO RELATED APPLICATIONS

This application is a continuation of U.S. application Ser. No. 18/362,350, titled "Monitoring Automated Virtual Machine Reclamation" filed on Jul. 31, 2023, currently pending, which is incorporated by reference in its entirety.

TECHNICAL FIELD

The present disclosure is directed to a monitoring process for automated virtual machine reclamation.

BACKGROUND

A virtual machine is a computing resource that can use software to run and deploy programs and applications. One or more virtual machines can run on a single physical machine, e.g., by hardware components in a hosting computing system. In some implementations, virtual machines can be deployed on computing systems of users—e.g., employees of a company, allowing the company to manage and control the software deployed on the user computing systems. The virtual machine can run its own operating system and perform functions separate from other virtual machines, even if those virtual machines are supported by the same hosting computing system. Virtual machines can allow entities (e.g., businesses, organizations, etc.) to run operating systems that act as entirely separate computers in an application window on a physical machine, similar to locally stored and/or locally hosted applications.

BRIEF DESCRIPTION OF THE DRAWINGS

FIG. 1 is a block diagram illustrating an overview of devices on which some implementations can operate.

FIG. 4 is a flow diagram illustrating a process used in some implementations for monitoring automated virtual machine reclamation.

The techniques introduced here may be better understood by referring to the following Detailed Description in conjunction with the accompanying drawings, in which like reference numerals indicate identical or functionally similar elements.

DETAILED DESCRIPTION

Figure 2:
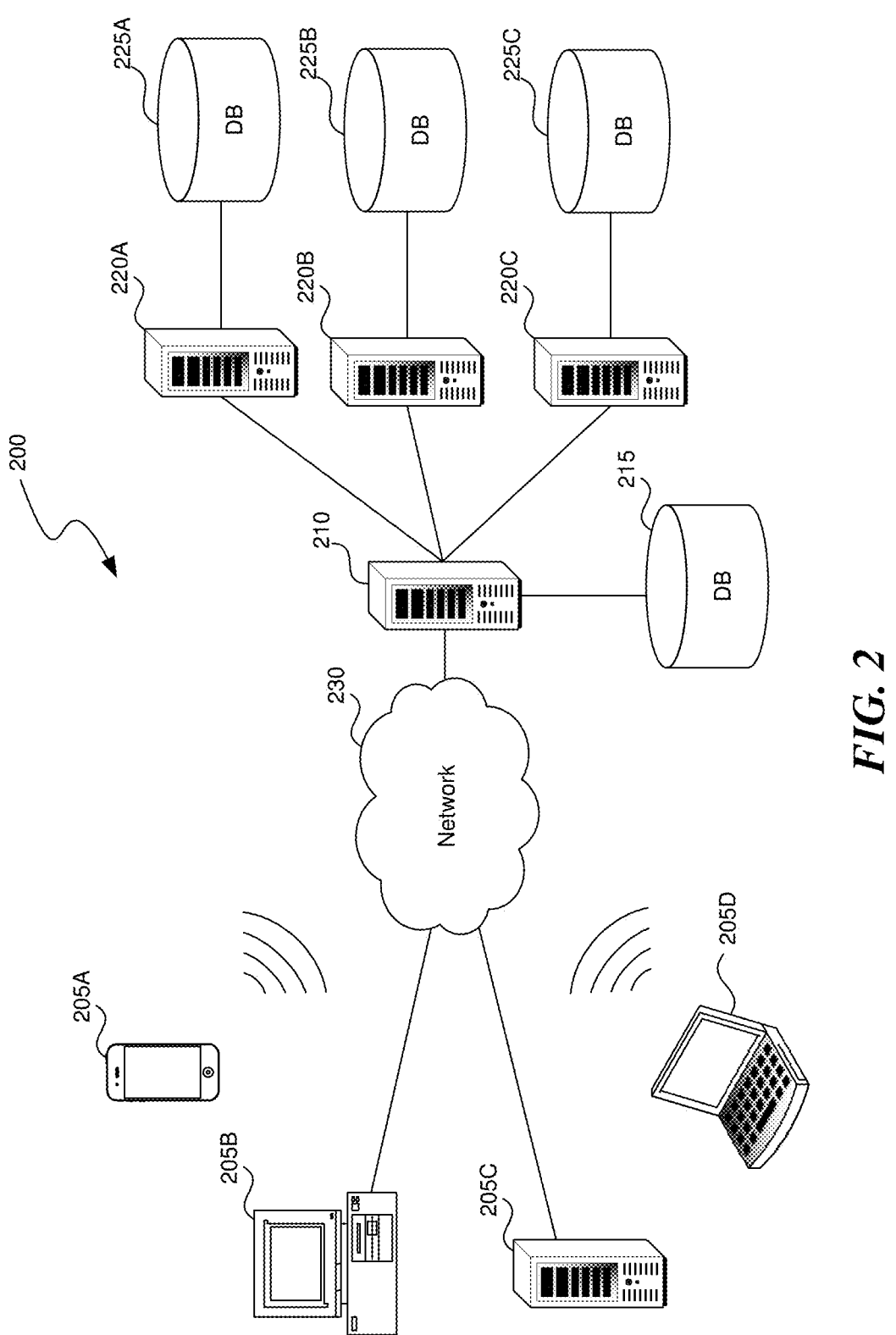
FIG. 2 is a block diagram illustrating an overview of an environment in which some implementations can operate.

Aspects of the present disclosure are directed to monitoring an automated virtual machine reclamation process via an algorithm that ensures that each step executes correctly before moving on to the next step. After each step of the process (e.g., placing a virtual machine in maintenance mode, assigning the virtual machine to a removal group, etc.), some implementations can determine whether the resulting data is correct. If the resulting data is incorrect, some implementations can initially revert any fields updated by the process to their correct value. Some implementations can further decide whether to resubmit the virtual machine for reclamation automatically, or queue it for manual review based on, for example, multiple or repeated failures, server or data center failures, etc. Thus, some implementations can not only automate each step of the reclamation process, but also provide process evaluation and error detection for the reclamation process.

For example, while performing an automated virtual machine reclamation process, some implementations can attempt to cause deletion of a virtual machine from its hosting computing device. Upon failure of the attempt, some implementations can generate metadata indicating that the deletion was not successful (e.g., a flag). However, in attempting to cause the deletion of the virtual machine, some implementations may generate other metadata inconsistent with deletion of the virtual machine (e.g., a status indicator of "deletion complete" on a graphical user interface accessed by a system administrator). Thus, some implementations can revert the inconsistent metadata to its previous state based on the deletion being unsuccessful (e.g., changing the status indicator on the graphical user interface back to "deletion incomplete"), and can automatically reattempt to cause deletion of the virtual machine from its hosting computing device.

The implementations described herein provide specific technological benefits in the field of virtual machine reclamation and reclamation monitoring. Conventionally, virtual machines eligible for reclamation are identified, selected, reclaimed, and monitored manually by a human having to access several disparate data sources and collect information from several different groups within an entity (e.g., legal department, human resources department, information technology department, etc.). In contrast, the implementations described herein provide for the transfer of data across and interactions between computing systems (e.g., representing the various entities, data sources, etc.). Further, implementations transform and revert data to and from predefined states, automatically correct execution errors, and resubmit virtual machines to the reclamation process.

Implementations can automatically identify eligible virtual machines, select virtual machines for reclamation, perform the reclamation process, and monitor the reclamation process without human intervention, resulting in saved manhours. Further, some implementations can automatically resubmit virtual machines having failures to the reclamation process, thereby more successfully and efficiently reducing or eliminating the number of virtual machines hosted by an entity that are not needed by the entity to perform its functions and operations. Thus, cost savings for the entity, reduced power consumption, higher storage space, and increased processing power can be achieved. The disclosed implementations are necessarily rooted in computer technology (e.g., executed solely by one or more computing systems without human intervention), and overcome a problem specifically arising in the realm of computer networks (e.g., reducing data usage and processing requirements by automatically monitoring and removing unused or unnecessary virtual machines from one or more computing systems).

Several implementations are discussed below in more detail in reference to the figures. FIG. 1 is a block diagram illustrating an overview of devices on which some implementations of the disclosed technology can operate. The devices can comprise hardware components of a device 100 that can monitor automated virtual machine reclamation. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, virtual machine reclamation monitoring system 164, and other application programs 166. Memory 150 can also include data memory 170, e.g., virtual machine reclamation process data, virtual machine reclamation metadata, virtual machine identification data, metadata state data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as virtual machine reclamation process data, virtual machine reclamation metadata, virtual machine identification data, and metadata state data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
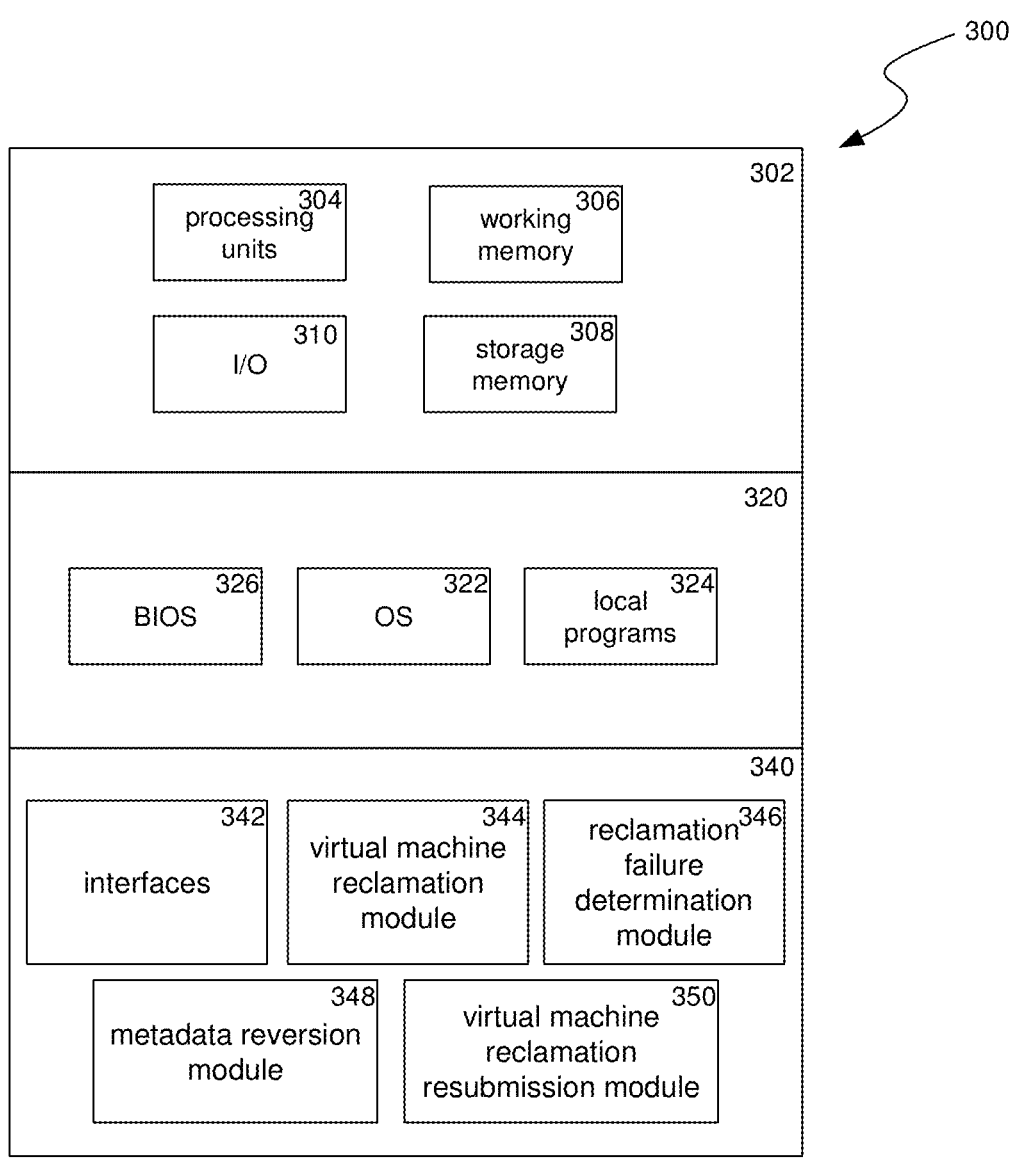
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include virtual machine reclamation module 344, reclamation failure determination module 346, metadata reversion module 348, virtual machine reclamation resubmission module 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Virtual machine reclamation module 344 can perform a process for automatically reclaiming eligible virtual machines, provided by a computing system, and hosted on one or more computing devices. Virtual machine reclamation module 344 can identify virtual machines that qualify for reclamation, and upon identification of these assets, automatically reclaim them. Virtual machine reclamation module 344 can determine whether a virtual machine should be reclaimed based on defined rules, such as technical standards, security standards, utilization matrices, asset management rules, business rules, etc., in order to remove non-operating or otherwise reclaimable assets. Virtual machine reclamation module 344 can automate each step of the reclamation process to delete virtual machines remotely without human intervention. For example, upon determining that one or more virtual machines are eligible for reclamation based on such rules, virtual machine reclamation module 344 can add such virtual machines to a reclamation list, place the virtual machines into maintenance mode, place the virtual machines into a removal group, unassign the users from the virtual machines, turn off the virtual machines, generate change tickets for the virtual machines, and delete the virtual machines from their hosting computing devices. Further details regarding performing an automated virtual machine reclamation process are described herein with respect to FIGS. 5A and 5B, as well as in U.S. patent application Ser. No. 18/059,092, filed Nov. 28, 2022, entitled "Automated Reclamation of Virtual Machines," which is herein incorporated by reference in its entirety.

Reclamation failure determination module 346 can monitor each step of the reclamation process, performed by virtual machine reclamation module 344, and automatically determine whether any of the steps have failed for any of the submitted virtual machines. Reclamation failure determination module 346 can determine whether a step has failed by analyzing metadata associated with the virtual machines that results from the step being performed. In other words, reclamation failure determination module 346 can analyze the metadata to determine if the metadata is consistent with the metadata that should be produced had the step been completed successfully. For example, if successful unassignment of a user from a virtual machine should result in a "NULL" value in an owner field associated with the virtual machine, but the user identifier is instead in the owner field, reclamation failure determination module 346 can determine that the user unassignment step failed. In some implementations, reclamation failure determination module 346 can further generate a log of the failure relative to the virtual machine. Further details regarding determining that a step of a virtual machine reclamation process has failed for a virtual machine by analyzing metadata resulting from the step are described herein with respect to block 402 of FIG. 4.

Metadata reversion module 348 can automatically revert at least some of the metadata, analyzed by reclamation failure determination module 346 and associated with the virtual machine, to a previous state. The previous state can be associated with the step having not been performed. In other words, any metadata that was changed by virtual machine reclamation module 344 when attempting to perform the unsuccessful step can be changed back to its previous value. For example, in attempting to place a virtual machine into maintenance mode, virtual machine reclamation module 344 can tag the virtual machine for removal, despite the virtual machine being unable to enter maintenance mode and be removed. Thus, in this example, metadata reversion module 348 can remove the tag from the virtual machine, as virtual machine reclamation module 344 may be unable to continue the removal process outside of maintenance mode. Further details regarding automatically reverting metadata associated with a virtual machine to a previous state are described herein with respect to block 404 of FIG. 4.

In some implementations, virtual machine reclamation resubmission module 350 can automatically resubmit the virtual machine, determined to have failed the reclamation process by reclamation failure determination module 346, to virtual machine reclamation module 344. Virtual machine reclamation module 344 can then again attempt to reperform the failed step. However, in some implementations, virtual machine reclamation resubmission module 350 can alternatively submit the virtual machine for manual review. For example, virtual machine reclamation resubmission module 350 can analyze a log of failures associated with the virtual machine and determine that virtual machine reclamation module 344 has failed a particular step relative to a virtual machine over a threshold number of times, and/or that virtual machine reclamation module 344 has failed over a threshold number of different steps of the reclamation process relative to a virtual machine. Thus, virtual machine reclamation resubmission module 350 can add the virtual machine to a queue for manual review, such as by a system administrator, to continue the reclamation process. In another example, virtual machine reclamation resubmission module 350 can, based on a type of failure (e.g., as indicated by a log generated when the failure occurred) add the virtual machine to the queue for manual review. Further details regarding automatically resubmitting a virtual machine for reclamation are described herein with respect to block 406 of FIG. 4.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

FIG. 4 is a flow diagram illustrating a process 400 used in some implementations for monitoring automated virtual machine reclamation. In some implementations, process 400 can be performed as a response to determining that a step of a virtual machine reclamation process has failed. In some implementations, process 400 can be performed "on demand" upon determining that a step of the virtual machine reclamation process has failed. In some implementations, process 400 can be performed on a schedule, e.g., at the end of the day, when servers are determined to have available processing capacity, and/or when a threshold number of virtual machines have failed a step of the virtual machine reclamation process.

In some implementations, process 400 can be performed by a computing system hosting the virtual machines (a "hosting computing system"), which, in some implementations, can be a server on a network, e.g., network 230 of FIG. 2. The hosting computing system can provide hardware components and/or data needed to support the virtual machines. In some implementations, the computing system can be associated with an entity, e.g., a company or other business, an organization (e.g., a governmental organization, an educational organization, or other formal or informal group of individuals), etc. In some implementations, process 400 can be performed by a computing system in operable communication with the hosting computing system and/or having access rights (including read, write, and delete rights) to data stored by the hosting computing system. In some implementations, process 400 can be performed by an automated virtual machine reclamation system that also performs the automated virtual machine reclamation process, such as that described in U.S. patent application Ser. No. 18/059,092, filed Nov. 28, 2022, entitled "Automated Reclamation of Virtual Machines," which is herein incorporated by reference in its entirety. In some implementations, process 400 can be performed by virtual machine reclamation monitoring system 164 of FIG. 1. In some implementations, process 400 can be performed by specialized components 340 of FIG. 3.

At block 402, process 400 can automatically determine that a step of a virtual machine reclamation process has failed for a virtual machine (of multiple virtual machines submitted for reclamation) by analyzing metadata, associated the virtual machine, that resulted from the step. In some implementations, the multiple virtual machines submitted for reclamation can be stored on respective computing devices associated with respective users assigned to the virtual machines. In some implementations, however, one or more virtual machines can be stored on computing devices that are not associated with a user, e.g., that are not assigned to a user. The computing devices can be any devices capable of executing, rendering, and/or displaying the virtual machine hosted by a computing system, such as a desktop computer, a laptop computer, a tablet, a mobile phone, etc. The computing devices can be in operable communication with the computing system, such as over a network (e.g., network 230 of FIG. 2), and/or in operable communication with a separate hosting computing system. In some implementations, the virtual machine reclamation process can be performed as a response to one or more user requests to revoke, e.g., turn over a virtual machine, on a schedule, when servers are determined to have available processing capacity, when a threshold number of virtual machines eligible for reclamation is reached, etc.

In some implementations, the virtual machine reclamation process can determine whether and/or which virtual machines can be reclaimed, as described further in U.S. patent application Ser. No. 18/059,092, filed Nov. 28, 2022, entitled "Automated Reclamation of Virtual Machines," which is herein incorporated by reference in its entirety. For example, in some implementations, the virtual machine reclamation process can determine whether there are contractual obligations and/or legal holds associated with the entity that would require one or more virtual machines to be retained. For example, a contractual obligation can be an obligation by the entity to retain a certain number of virtual machines, regardless of whether the virtual machines are being utilized in accordance with one or more rules described below. In another example, the contractual obligation can be between the entity and another entity (e.g., a vendor for the entity, a contracting company having contractors assigned to the entity, etc.). In some implementations, the legal hold can be a hold placed by a legal department within the entity that blocks the virtual machine from being reclaimed. For example, the legal hold may specify that a virtual machine has to be retained for a threshold amount of time after an assigned user is no longer associated with the entity and/or when a virtual machine has been revoked or turned over by a user, to ensure that any essential or otherwise important data is not lost.

If there are no contractual obligations or legal holds associated with the entity, the virtual machine reclamation process can automatically identify one or more virtual machines that are eligible to be reclaimed by applying one or more rules to the virtual machine. In some implementations, the one or more rules can be applied to inactivity data with respect to the user using the virtual machine. For example, the virtual machine reclamation process can automatically select a virtual machine for reclamation when the inactivity data includes an indication that an assigned user (and/or any user) has not used the virtual machine for a threshold period of time and/or since the virtual machine was provided and/or activated.

In some implementations, the one or more rules can be applied to availability data of the user, i.e., data indicating whether the user is available to use the virtual machine. In some implementations, the availability data can include human resources data associated with the entity, e.g., an indication that an assigned user is no longer associated with the entity. In some implementations, the availability data can include an indication that the user is on extended leave with respect to the entity.

In some implementations, the one or more rules can be applied to assignment data for the virtual machine. The assignment data can include an indication of who, if anyone, the virtual machine is assigned to, which can be a single user or two or more users. For example, the virtual machine reclamation process can decline to select an identified virtual machine for reclamation if there is at least one user still assigned to the machine. In some implementations, a combination of the above-described rules can be applied to automatically identify a virtual machine for reclamation.

The virtual machine reclamation process can include multiple steps, any of which can fail as detected by process 400 at block 402. In some implementations, the virtual machine reclamation process can include placing the virtual machines in maintenance mode, tagging the virtual machines for removal, unassigning the respective users assigned to the virtual machines, disabling the virtual machines, and/or facilitating deletion of the virtual machines from the respective computing devices. In some implementations, the virtual machine reclamation process can further include facilitating deletion of the virtual machines from the hosting computing system. In some implementations, the virtual machine reclamation process can further facilitate deletion of the virtual machine (and/or references to the virtual machine) from one or more other computing systems associated with one or more other entities (e.g., vendor computing systems, cloud computing systems, data centers, etc.). Further details regarding automatically reclaiming a selected virtual machine are described below with respect to FIGS. 5A and 5B.

In some implementations, the metadata, resulting from the step failure analyzed by process 400, can be indicative of whether or not the step has been completed successfully, e.g., via a flag or other indicator. For example, if the virtual machine has been successfully placed in maintenance mode, an entry in a maintenance mode field associated with the virtual machine can be changed from "0" to "1," and a removal group tag for the virtual machine can be changed to append the word "REMOVE." Conversely, if the virtual machine has not been successfully placed in maintenance mode, the maintenance mode field will not be changed from "0" to "1," and/or the removal group tag for the virtual machine will not be changed to append the word "REMOVE." Exemplary graphical user interfaces illustrating successful and failed placement of virtual machines in maintenance mode and changing a removal group tag associated with a virtual machine are shown and described further herein with respect to FIGS. 6A and 6B. In some implementations, however, the flag or other indicator can be generated in a separate log not illustrated in FIGS. 6A-6B. Further, in some implementations, it is contemplated that the log can indicate that the step has failed, and that both the entry in the maintenance mode field and the removal group tag can incorrectly indicate that the step was successfully completed.

Figure 7A:
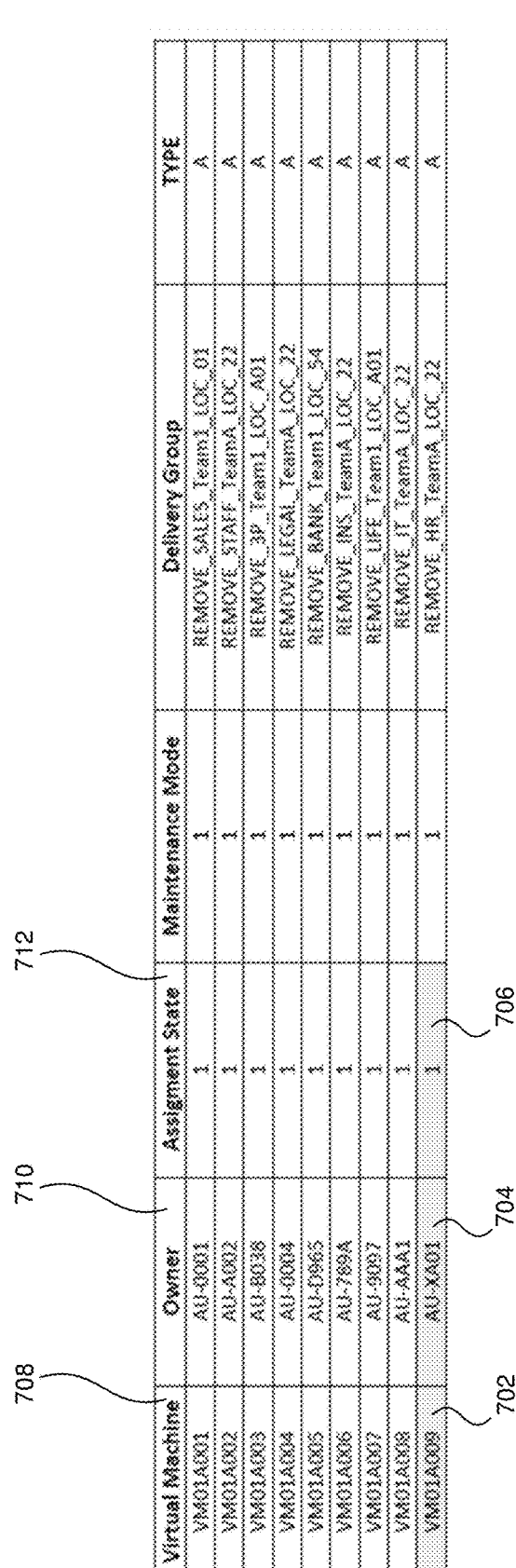
FIG. 7A is a conceptual diagram illustrating an example graphical user interface showing virtual machines to be unassigned from their respective users in an automated virtual machine reclamation process.
Figure 7B:
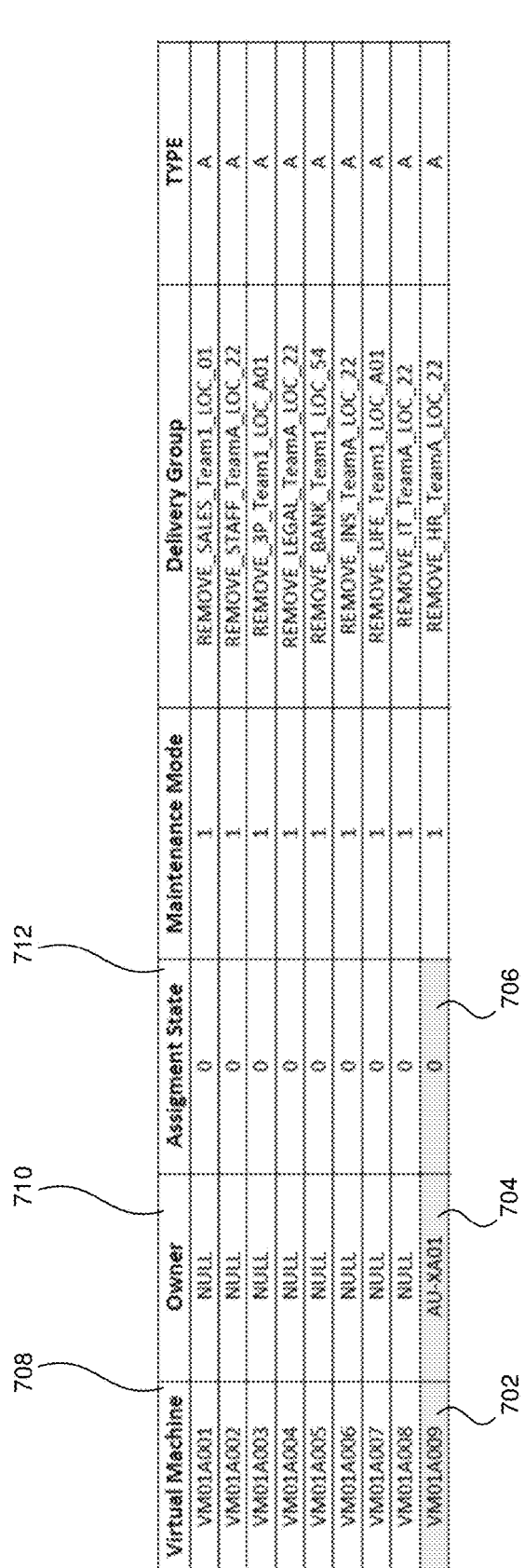
FIG. 7B is a conceptual diagram illustrating an example graphical user interface showing a virtual machine that failed to have its user unassigned.

In another example, if the user associated with the virtual machine has been successfully unassigned, an entry in an assignment field associated with the virtual machine can be changed from "1" to "0," and/or an entry in an owner field associated with the virtual machine can be changed from a user identifier to "NULL." Conversely, if the virtual machine has not been successfully unassigned from the user, the assignment field will not be changed from "1" to "0,"

and/or the entry in the owner field will not be changed from a user identifier to "NULL." Exemplary graphical user interfaces illustrating successful and failed unassignment of users to virtual machines are shown and described further herein with respect to FIGS. 7A and 7B. In some implementations, however, the flag or other indicator can be generated in a separate log not illustrated in FIGS. 7A-7B. Further, in some implementations, it is contemplated that the log can indicate that the step has failed, and that both the entry in the owner field and the user identifier can incorrectly indicate that the step was successfully completed.

At block 404, process 400 can automatically revert at least some of the metadata associated with the virtual machine to a previous state. The previous state can be associated with the step having not been performed. For example, if the maintenance mode field was changed from "0" to "1," but the removal group tag for the virtual machine was not changed to append the word "REMOVE,' process 400 can revert the maintenance mode field to "0," indicating that the step was not completed successfully. Conversely, if the maintenance mode field was not changed from "0" to "1," but the tag for the virtual machine was changed to append the word "REMOVE," process 400 can revert the removal group tag for the virtual machine to remove the word "REMOVE." An exemplary graphical user interface illustrating reversion of metadata based on a virtual machine being unsuccessfully placed in maintenance mode is shown and described further herein with respect to FIG. 6C. When the flag or other indicator that the step failed is included in a log or separate metadata field, it is contemplated that process 400 may need to revert both the maintenance mode field and the removal group tag for the virtual machine.

In another example, if the entry in the assignment field associated with the virtual machine was changed from "1" to "0," but the entry in the owner field associated with the virtual machine was not changed from a user identifier to "NULL," process 400 can revert the entry in the assignment field to "1." If the entry in the assignment field associated with the virtual machine was not changed from "1" to "0," but the entry in the owner field associated with the virtual machine was changed from the user identifier to "NULL," process 400 can revert the entry in the owner field to the user identifier. An exemplary graphical user interface illustrating reversion of metadata based on a virtual machine being unsuccessfully unassigned from a user is shown and described further herein with respect to FIG. 7C. When the flag or other indicator that the step failed is included in a log or separate metadata field, it is contemplated that process 400 may need to revert both the entry in the assignment field and the user identifier in the owner field.

At block 406, process 400 can automatically resubmit the virtual machine for reclamation to the automated virtual machine reclamation process, and the automated virtual machine reclamation process can attempt to reperform the step that failed. If the reperformed step is successful, the automated virtual machine process can continue to attempt to perform the proceeding steps. If the step again fails, or if a proceeding step fails, process 400 can return to block 402, followed by block 404. In some implementations, after block 404, process 400 can proceed to block 406. In some implementations, however, it is contemplated that upon detection of the further failure, process 400 can instead place the virtual machine in a queue for manual review by a human operator, such as a system administrator. In some implementations, process 400 can flag the virtual machine for manual review based on other factors, such as a type of failure. For example, process 400 can determine the type of failure based on data generated when the step failed. Process 400 can then, in some implementations, place the virtual machine in the queue for manual review based on the type of the failure. For example, an infrastructure failure (e.g., a system outage, power loss, data center outage, etc.) would render performing block 406 redundant; thus, process 400 can instead flag the virtual machine for manual review and reperformance of the step when the infrastructure failure is remedied. In some implementations, process 400 can allow the queue to reach a threshold number of virtual machines needing manual review before notifying the human operator, such as through an automated message transmission. In some implementations, however, process 400 can notify the human operator of the virtual machine needing manual review immediately upon failure, i.e., "on demand."

In some implementations, process 400 can generate a log indicating that the step failed (or repeatedly failed) for the virtual machine. In some implementations, the log can include one or more of an identifier for the virtual machine, the step that failed, a reason or type of the failure, etc. In some implementations, the log can further indicate how many times a step has failed and/or how many times different steps have failed. In some implementations, based on a number of logged failures exceeding a threshold (e.g., 3 failures of the same or different steps), process 400 can place the virtual machine in the queue for manual review, as described further above.

Figure 5A:
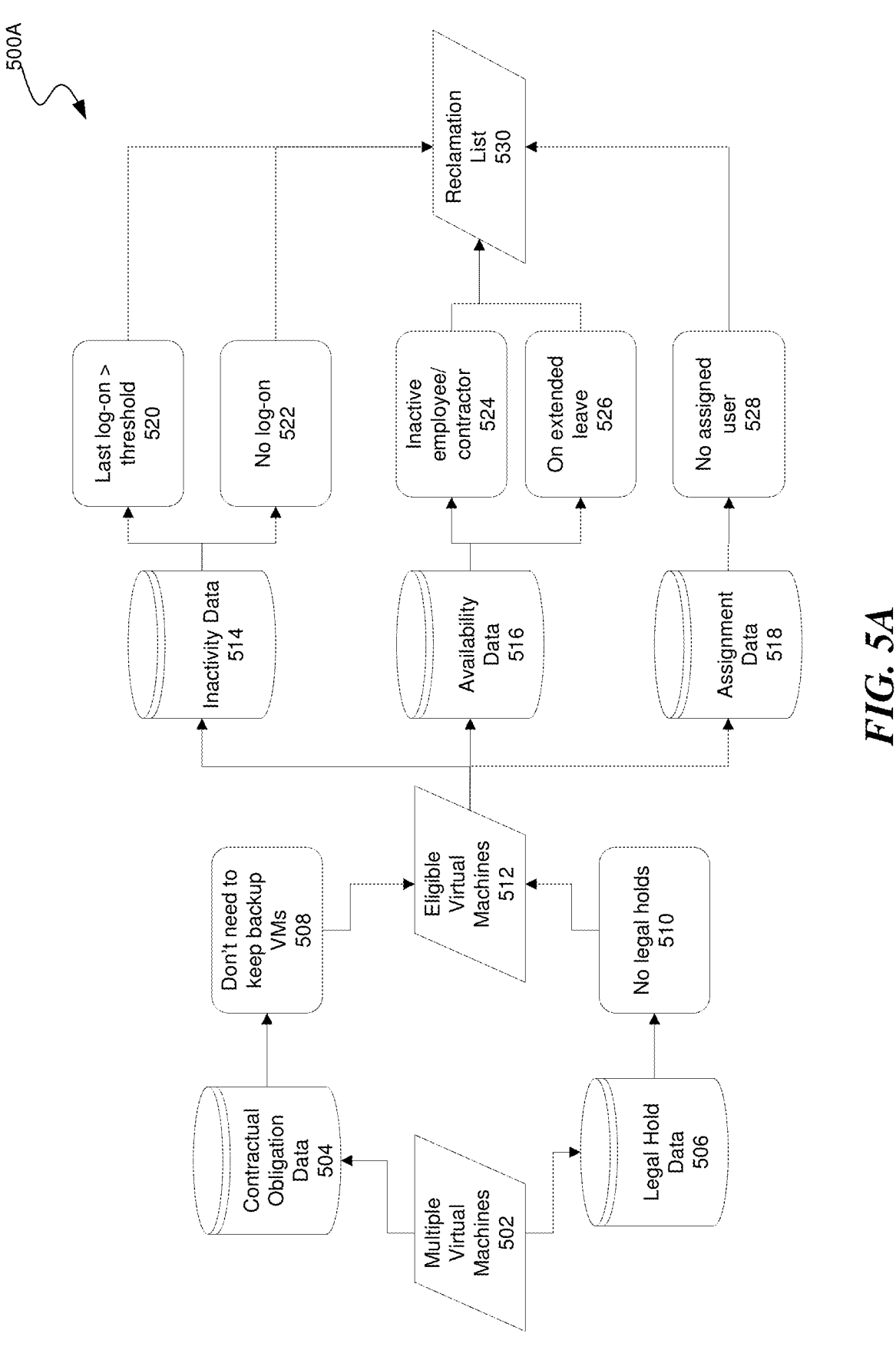
FIG. 5A is a flow diagram illustrating a process used in some implementations for building a reclamation list of virtual machines.

FIG. 5A is a flow diagram illustrating a process 500A used in some implementations for building a reclamation list 530 of virtual machines. In some implementations, process 500A can be performed as a response to a user or administrator request to generate reclamation list 530 of virtual machines. In some implementations, process 500A can be performed on a schedule, e.g., when servers have available processing bandwidth, every day, every few days, every week, etc. In some implementations, process 500A can be performed once, while in other implementations, process 500A can be repeated more than once or continuously. In some implementations, process 500A can be performed by a computing system hosting virtual machines (a "hosting computing system"). In some implementations, process 500A can be performed by another computing device or system in operable communication with the hosting computing system and capable of receiving and transmitting data, executing commands, etc., to, from, or on the hosting computing system. In some implementations, process 500A can be performed by virtual machine reclamation monitoring system 164 of FIG. 1.

Process 500A can receive multiple virtual machines 502 as input. Process 500A can access contractual obligation data 504 associated with multiple virtual machines 502 to determine, at block 508, that backup virtual machines are not necessary. For example, process 500A can analyze contractual obligation data 504 to determine that an entity hosting (or otherwise associated with) multiple virtual machines 502 does not have a contract to retain a certain number of virtual machines, i.e., to identify virtual machines eligible for reclamation based on contractual obligation data 504.

Process 500A can further access legal hold data 506 associated with multiple virtual machines 502 to determine, at block 510, that there are no legal holds on one or more of multiple virtual machines 502 in order to identify virtual machines eligible for reclamation. For example, legal hold data 506 may indicate that one or more of multiple virtual machines 502 need to be retained for legal reasons (e.g., for a particular period of time, for a particular legal purpose, etc.), thus making certain virtual machines of multiple virtual machines 502 ineligible for reclamation. One or more of multiple virtual machines 502 that are determined to be eligible for reclamation based on both of contractual obligation data 504 and legal hold data 506 can be identified as eligible virtual machines 512.

Process 500A can formulate reclamation list 530 by applying one or more rules to inactivity data 514, availability data 516, and/or assignment data 518 associated with eligible virtual machines 512. From inactivity data 514, process 500A can determine one or both of: the last log-on to a virtual machine of eligible virtual machines 512 is greater than a threshold (e.g., 30, 45, 60 days, etc.), and/or there have been no log-ons to a virtual machine of eligible virtual machines 512 at block 522. If either or both determinations are made at blocks 520-522, process 500A can add the virtual machine to reclamation list 530.

From availability data 516, process 500A can determine that a user associated with a virtual machine of eligible virtual machines 512 is an inactive employee or contractor at block 524. In addition, from availability data 516, process 500A can determine that the user associated with the virtual machine of eligible virtual machines 512 is on extended leave at block 526, and in some implementations, determine whether that user is allowed to access the virtual machine while on extended leave. In some implementations, if the determination is made at block 524 that the user is an inactive employee or contractor, or at block 526 that the user is on extended leave, process 500A can add the virtual machine to reclamation list 530.

From assignment data 518, process 500A can determine at block 528 that there is no assigned user to a virtual machine of eligible virtual machines 512. Based on the determination at block 528, process 500A can add the virtual machine to reclamation list 530. In some implementations, after all of the virtual machines meeting blocks 520, 522, 524, 526, and/or 528 have been added to reclamation list 530, process 500A can revise reclamation list 530 to remove any redundant entries.

Figure 5B:
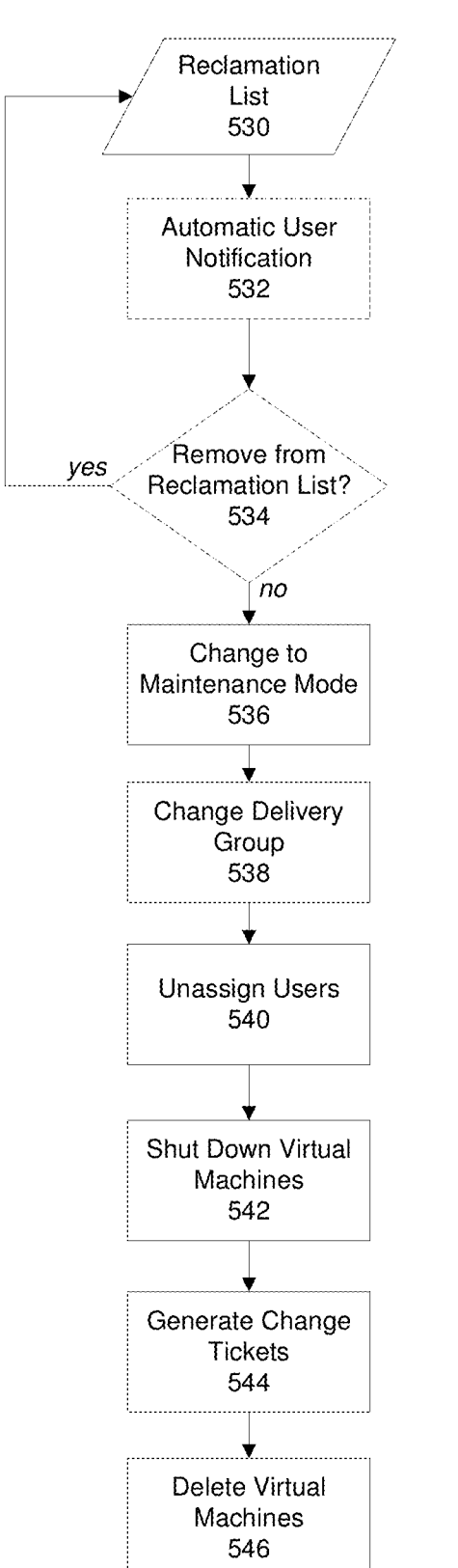
FIG. 5B is a flow diagram illustrating a process used in some implementations for performing reclamation of virtual machines on a reclamation list.

FIG. 5B is a flow diagram illustrating a process 500B used in some implementations for performing reclamation of virtual machines on a reclamation list 530. In some implementations, process 500B can be performed as a response to a user or administrator request to reclaim virtual machines. In some implementations, process 500B can be performed on a schedule, e.g., when servers have available processing bandwidth, every day, every few days, every week, etc. In some implementations, process 500B can be performed once, while in other implementations, process 500B can be repeated more than once or continuously. In some implementations, process 500B can be performed by a computing system hosting virtual machines (a "hosting computing system"). In some implementations, process 500B can be performed by another computing device or system in operable communication with the hosting computing system and capable of receiving and transmitting data, executing commands, etc., to, from, or on the hosting computing system. In some implementations, process 500B can be performed by virtual machine reclamation monitoring system 164 of FIG. 1. In some implementations, process 500B of FIG. 5B can be performed in response to completion of process 500A of FIG. 5A.

Process 500B can receive reclamation list 530 as input. While any block can be removed or rearranged in various implementations, blocks 532 and 534 are shown in dashed lines to indicate there are specific instances where blocks 532 and 534 are skipped. In some implementations, process 500B can identify users associated with virtual machines on reclamation list 530 (e.g., from assignment data 518), and transmit, at block 532, an automatic user notification to those users. In some implementations, automatic user notification is not necessary, e.g., when assignment data 518 indicates that there is no user assigned to a particular virtual machine, and/or when availability data 516 indicates that the assigned user is an inactive employee or contractor at block 524. In response to sending the automatic user notification at block 532, one or more users associated with virtual machines on reclamation list 530 can opt to remove the virtual machine from reclamation list 530 at block 534. If one or more users associated with virtual machines do not opt to remove respective virtual machines from reclamation list 530 at block 534 (or if no user is assigned to particular virtual machines, or if particular virtual machines are assigned to employees or contractors no longer associated with the entity), process 500B can continue to block 536.

At block 536, process 500B can change the virtual machines on reclamation list 530 to maintenance mode to allow for changes to be made to the virtual machines. In some implementations, process 500B can put all of the virtual machines on reclamation list 530 into maintenance mode at the same time to allow for changes to be made to the virtual machines simultaneously or concurrently. Once the virtual machines are put on maintenance mode, process 500B can continue to block 538.

At block 538, process 500B can change the delivery group (i.e., the removal group) for the virtual machines on reclamation list 530. In some implementations, all of the virtual machines on reclamation list 530 can be put into a "remove" group, which can be mandatory before deletion at block 546. In addition, in some implementations, at block 538, process 500B can remove any references to the virtual machines from particular data centers.

At block 540, process 500B can unassign any assigned users from the virtual machines on reclamation list 530. For example, process 500B can disassociate any assigned users from the virtual machines within assignment data 518. In some implementations, the virtual machines can instead be assigned a null or zero value in assignment data 518.

At block 542, process 500B can disable the virtual machines on reclamation list 530. In some implementations, all of the virtual machines on reclamation list 530 can be turned off or deactivated prior to deletion at block 536. In some implementations, process 500B can automatically and remotely shut down the virtual machines on reclamation list 530.

At block 544, process 500B can generate change tickets. In some implementations, process 500B can automatically generate change tickets in compliance with policies of the entity with respect to deleting virtual machines. In some implementations, the change tickets can be automatically transmitted to a reviewer, e.g., an information technology specialist associated with the entity.

At block 536, process 500B can delete the virtual machines. In some implementations, process 500B can delete the virtual machines from their respective user computing devices. In some implementations, process 500B can delete the virtual machines from the hosting computing system (e.g., all instances of the virtual machines and/or references to the virtual machines on computing devices across the entity). In some implementations, process 500B can facilitate deletion of the virtual machines from one or more other computing systems, such as vendor computing systems, data centers, etc., that provide or receive data from the virtual machines.

Figure 6A:
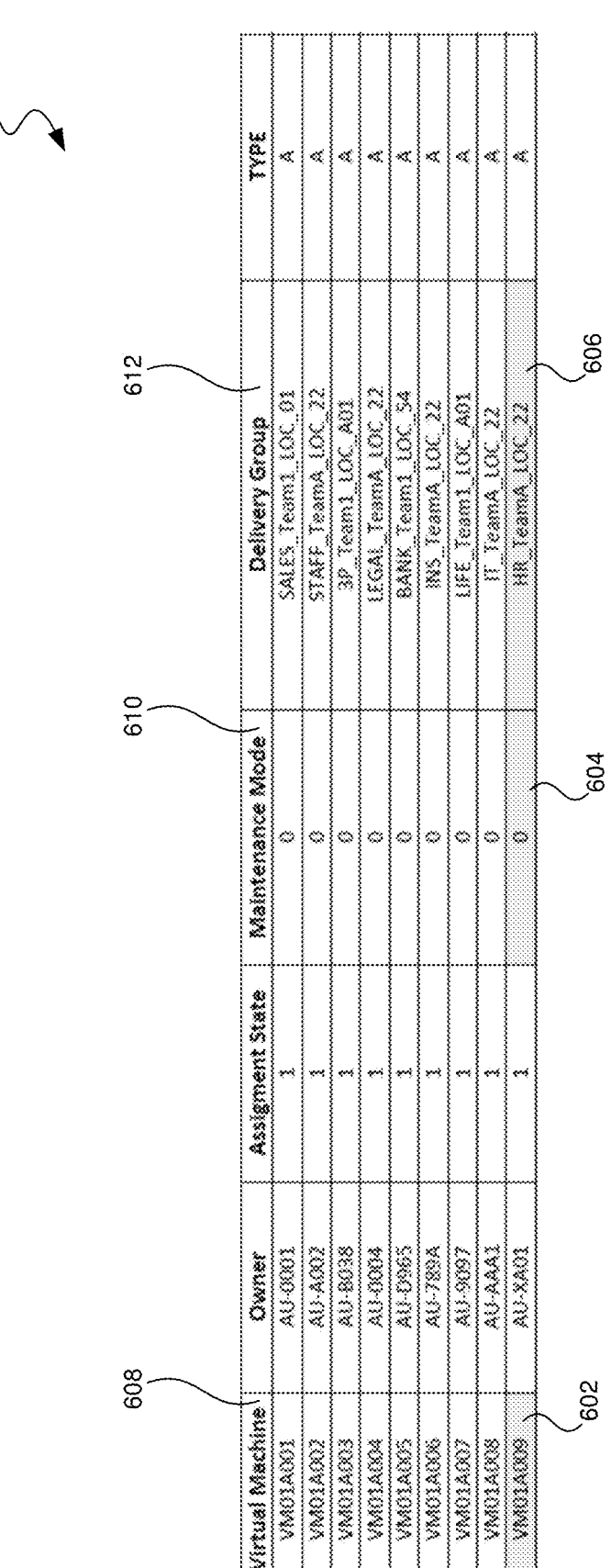
FIG. 6A is a conceptual diagram illustrating an example graphical user interface showing virtual machines to be put into a virtual machine state in an automated virtual machine reclamation process.

FIG. 6A is a conceptual diagram illustrating an example graphical user interface (GUI) 600A showing virtual machines 608 to be put into a virtual machine state in an automated virtual machine reclamation process. Virtual machines 608 can have corresponding maintenance mode fields 610 and group tags 612 (corresponding to groups of virtual machines 608). As shown in GUI 600A, none of virtual machines 608 have been placed in maintenance mode (as indicated by maintenance mode fields 610), and group tags 612 indicate that none of virtual machines 608 have been placed into a removal group. For example, virtual machine 602 (having identifier "VM01A009") has a "0" in maintenance mode field 604 (indicating that virtual machine 602 has not been placed in maintenance mode), and has a group tag 606 of "HR_TeamA_LOC_22" (indicating that virtual machine 602 has not been placed into a removal group).

Figure 6B:
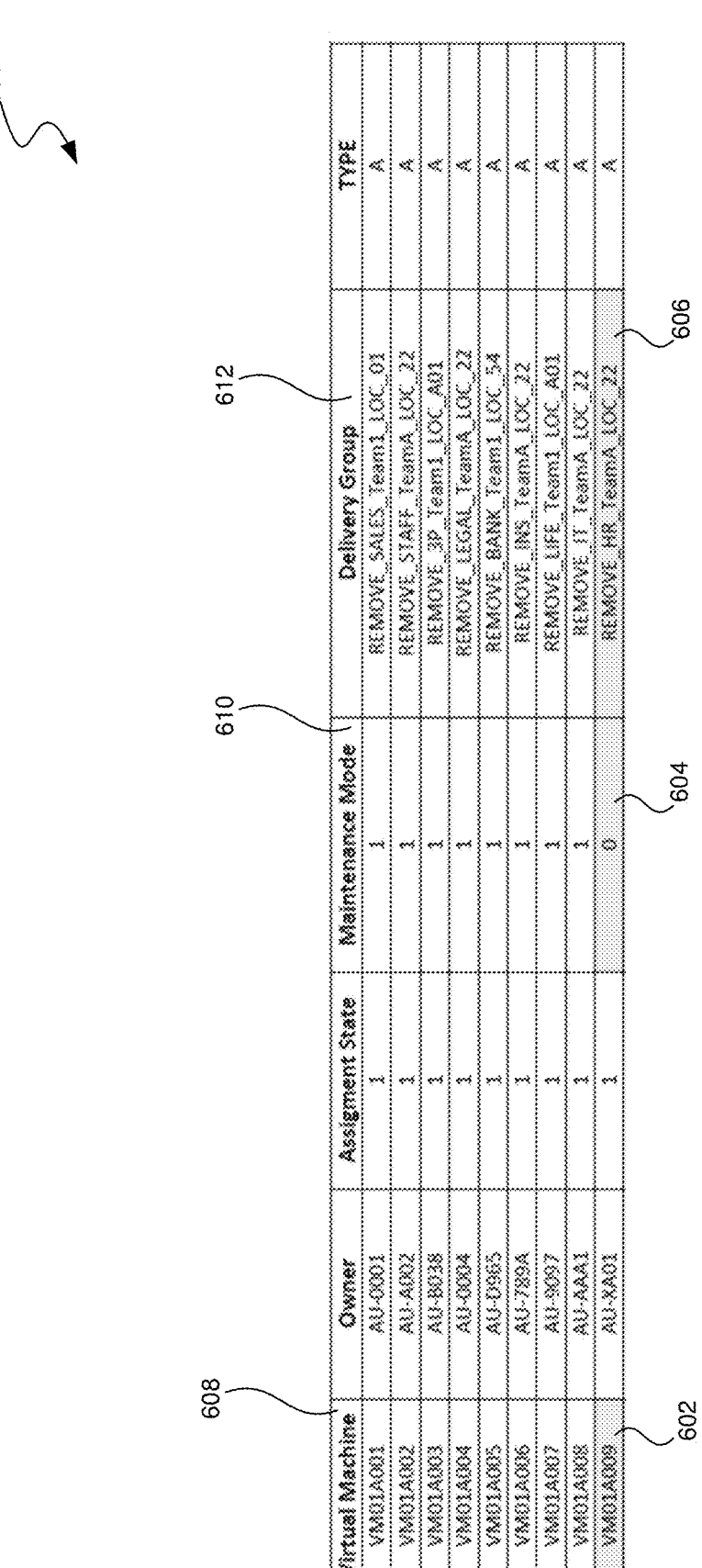
FIG. 6B is a conceptual diagram illustrating an example graphical user interface showing a virtual machine that failed to enter a virtual machine state.

FIG. 6B is a conceptual diagram illustrating an example graphical user interface (GUI) 600B showing a virtual machine 602 that failed to enter a virtual machine state. As shown in GUI 600B, maintenance mode field 604, corresponding to virtual machine 602, has a value of "0," indicating that virtual machine 602 did not successfully enter maintenance mode. Nevertheless, in attempting to execute the step of placing virtual machine 602 into maintenance mode, group tag 606 was changed to "REMOVE_HR_TeamA_LOC_22," incorrectly placing virtual machine 602 into a removal group.

Figure 6C:
FIG. 6C is a conceptual diagram illustrating an example graphical user interface showing metadata that has been reverted for a virtual machine that failed to enter a virtual machine state.

FIG. 6C is a conceptual diagram illustrating an example graphical user interface (GUI) 6000 showing metadata that has been reverted for a virtual machine 602 that failed to enter a virtual machine state. Based on a determination from GUI 600B of FIG. 6B that virtual machine 602 failed to enter maintenance mode (e.g., as indicated by maintenance mode field 604 having a value of "0"), some implementations can revert group tag 606 to its previous state (e.g., "HR_TeamA_LOC_22," as shown in GUI 600A of FIG. 6A), i.e., its state prior to attempting to place virtual machine 602 in maintenance mode. Thus, virtual machine 602 can be removed from the removal group. Some implementations can then reattempt to place virtual machine 602 successfully into maintenance mode.

FIG. 7A is a conceptual diagram illustrating an example graphical user interface (GUI) 700A showing virtual machines 708 to be unassigned from their respective users in an automated virtual machine reclamation process. Virtual machines 708 can have corresponding owner fields 710 and assignment fields 712. As shown in GUI 700A, all of virtual machines 708 are assigned (as indicated by assignment fields 712), and owner fields 710 indicate the particular owners of virtual machines 708. For example, virtual machine 702 (having identifier "VM01A009") has a "1" in assignment field 706 (indicating that virtual machine 702 has a user assigned), and owner field 704 indicates that virtual machine 702 is assigned to a user corresponding to identifier "AU-XA01" (indicating that virtual machine 702 is still assigned to a particular user).

FIG. 7B is a conceptual diagram illustrating an example graphical user interface (GUI) 700B showing a virtual machine 702 that failed to have its user unassigned. As shown in GUI 700B, owner field 704 indicates that the user corresponding to identifier "AU-XA01" is still assigned to virtual machine 702, indicating that the user was not successfully unassigned from virtual machine 702. Nevertheless, in attempting to execute the step of assigning the user from virtual machine 702, assignment field 706 was changed from "1" to "0," incorrectly indicating that the user was successfully unassigned from virtual machine 702.

Figure 7C:
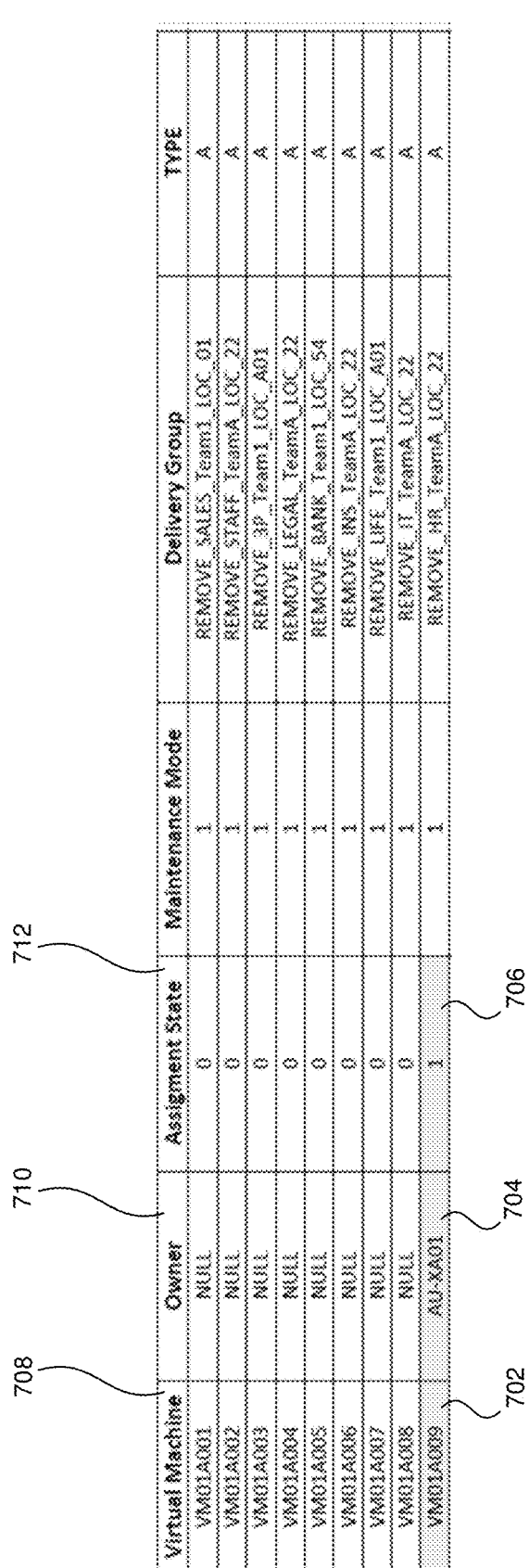
FIG. 7C is a conceptual diagram illustrating an example graphical user interface showing metadata that has been reverted for a virtual machine that failed to have its user unassigned.

FIG. 7C is a conceptual diagram illustrating an example graphical user interface (GUI) 7000 showing metadata that has been reverted for a virtual machine 702 that failed to have its user unassigned. Based on a determination from GUI 700B of FIG. 7B that virtual machine 702 failed to have its user successfully unassigned (e.g., as indicated by owner field 704 including an identifier of the user), some implementations can revert assignment field 706 to its previous state (e.g., "1," as shown in GUI 700A of FIG. 7A), i.e., its state prior to attempting to unassign the user from virtual machine 702. Thus, GUI 7000 now properly indicates that the user was not unassigned from virtual machine 702. Some implementations can then reattempt to unassign the user from virtual machine 702.

Figure 8:
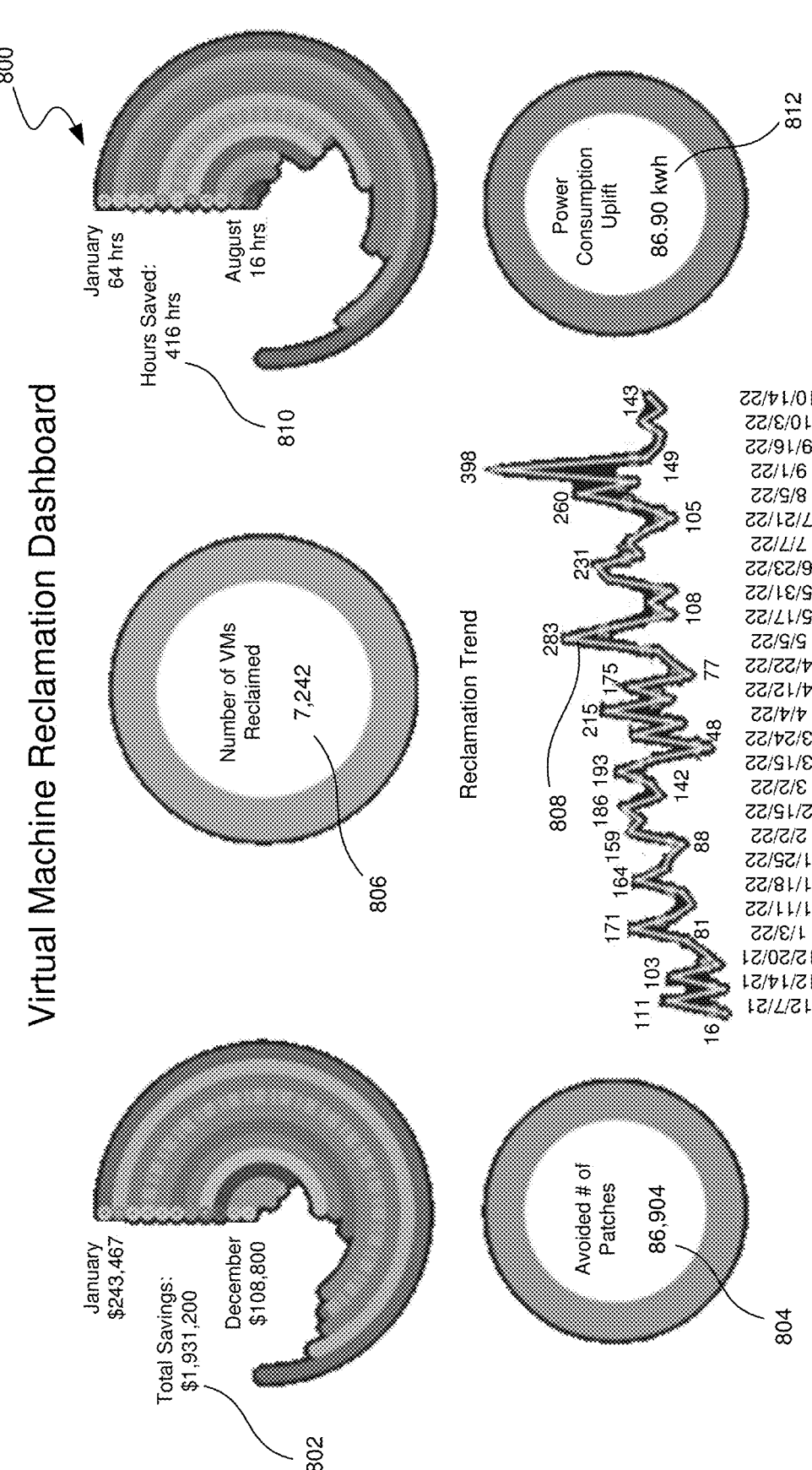
FIG. 8 is a conceptual diagram illustrating an example virtual machine reclamation dashboard according to some implementations of the present technology.

FIG. 8 is a conceptual diagram illustrating an example virtual machine reclamation dashboard 800 according to some implementations of the present technology. Virtual machine reclamation dashboard 800 can graphically and textually illustrate a number of advantages provided by the automated virtual machine reclamation systems and methods that can be monitored by some implementations described herein. As shown in virtual machine reclamation dashboard 800, in an example, the automated virtual machine reclamation systems and methods that can be monitored as described herein resulted in a ten-month total savings 802 of $1.93M; 86,904 patch failures avoided 804; 7,242 virtual machines reclaimed 806; 416 manhours saved 810; and a power consumption uplift 812 of 86.90 kWh. Virtual machine reclamation dashboard 800 can further include a graph showing the reclamation trend 808 across the ten-month period.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:
1. A method comprising:
  automatically determining that a step, for a virtual machine of multiple virtual machines, of a virtual machine reclamation process has failed by analyzing metadata, associated with the virtual machine, resulting from the failed step, wherein the virtual machine reclamation process is performed for the multiple virtual machines which are stored on one or more respective computing devices, the virtual machine reclamation process including:
    tagging the multiple virtual machines for removal,
    disabling the multiple virtual machines, and
    facilitating deletion of the multiple virtual machines from the respective computing devices;
  automatically reverting at least some of the metadata associated with the virtual machine to a previous state, the previous state being associated with the failed step; and automatically attempting to reperform at least the failed
step of the virtual machine reclamation process.

2. The method of claim 1, further comprising:

based on determining that the step failed for the virtual
machine, generating a log indicating that the step failed
for the virtual machine.

3. The method of claim 1, further comprising:

after attempting to reperform the failed step, determining
that the step failed again; and placing the virtual machine in a queue for manual review.

4. The method of claim 1, further comprising:

after determining that the step failed, determining a type
of failure; and based on the type of failure, placing the virtual machine
in a queue for manual review.

5. The method of claim 4, wherein the type of failure is
an infrastructure outage.

6. The method of claim 1, further comprising:

after attempting to reperform the failed step, determining
that the step failed again;

after determining that the step failed again, determining a
type of failure; and based on the type of failure, placing the virtual machine
in a queue for manual review.

7. The method of claim 1, further comprising:

after determining that the step failed, analyzing a log of
multiple failures in reclaiming the virtual machine; and based on a number of the multiple failures exceeding a
threshold, placing the virtual machine in a queue for
manual review.

8. The method of claim 1, wherein the multiple virtual
machines are automatically selected for reclamation by
applying one or more rules, the one or more rules being
applied to one or more of: a) inactivity data with respect to
the respective users of the multiple virtual machines, b)
availability, of the respective users, to use the multiple
virtual machines, or c) both.

9. The method of claim 1, wherein the virtual machine
reclamation process further includes:

facilitating deletion of one or more of the multiple virtual
machines from a computing system providing at least
one of the multiple virtual machines, the computing
system being associated with a first entity.

10. The method of claim 9, wherein the virtual machine
reclamation process further includes:

facilitating deletion of at least one of the multiple virtual
machines from one or more other computing systems
associated with one or more second entities other than
the first entity.

11. The method of claim 9, wherein the multiple virtual
machines are automatically identified as being eligible to be
reclaimed by analyzing contractual obligations and legal
holds associated with the first entity.

12. A non-transitory computer-readable storage medium
storing instructions that, when executed by a computing
system, cause the computing system to perform a process
comprising:

automatically determining that a step, for a virtual
machine of multiple virtual machines, of a virtual
machine reclamation process has failed by analyzing
metadata, associated with the virtual machine, resulting
from the failed step, wherein the virtual machine rec-
lamation process is performed for the multiple virtual
machines which are stored on one or more respective
computing devices, the virtual machine reclamation
process including:

disabling the multiple virtual machines, and facilitating deletion of the multiple virtual machines
from the respective computing devices;

automatically reverting at least some of the metadata
associated with the virtual machine to a previous state,
the previous state being associated with the failed step;
and automatically attempting to reperform at least the failed
step of the virtual machine reclamation process.

13. The non-transitory computer-readable storage
medium of claim 12, wherein the process further comprises:

after attempting to reperform the failed step, determining
that the step failed again; and placing the virtual machine in a queue for manual review.

14. The non-transitory computer-readable storage
medium of claim 12, wherein the process further comprises:

after attempting to reperform the failed step, determining
that the step failed again;

after determining that the step failed again, determining a
type of failure; and based on the type of failure, placing the virtual machine
in a queue for manual review.

15. The non-transitory computer-readable storage
medium of claim 12, wherein the process further comprises:

after determining that the step failed, analyzing a log of
multiple failures in reclaiming the virtual machine; and based on a number of the multiple failures exceeding a
threshold, placing the virtual machine in a queue for
manual review.

16. The non-transitory computer-readable storage
medium of claim 12, wherein the multiple virtual machines
are automatically selected for reclamation by applying one
or more rules, the one or more rules being applied to one or
more of: a) inactivity data with respect to the respective
users of the multiple virtual machines, b) availability, of the
respective users, to use the multiple virtual machines, or c)
both.

17. A computing system for monitoring automated virtual
machine reclamation, the computing system comprising:

one or more processors; and one or more memories storing instructions that, when
executed by the one or more processors, cause the
computing system to perform a process comprising:

automatically determining that a step, for a virtual
machine of multiple virtual machines, of a virtual
machine reclamation process has failed by analyzing
metadata, associated with the virtual machine, result-
ing from the failed step, wherein the virtual machine
reclamation process is performed for the multiple
virtual machines which are stored on one or more
respective computing devices, the virtual machine
reclamation process including:

disabling the multiple virtual machines, and facilitating deletion of the multiple virtual machines
from the respective computing devices;

automatically reverting at least some of the metadata
associated with the virtual machine to a previous
state, the previous state being associated with the
failed step; and automatically attempting to reperform at least the failed
step of the virtual machine reclamation process.

18. The computing system of claim 17, wherein the virtual
machine reclamation process further includes:

facilitating deletion of one or more of the multiple virtual
machines from a computing system providing at least
one of the multiple virtual machines, the computing
system being associated with a first entity.

19. The computing system of claim 18, wherein the virtual machine reclamation process further includes:

facilitating deletion of at least one of the multiple virtual machines from one or more other computing systems associated with one or more second entities other than the first entity.

20. The computing system of claim 18, wherein the multiple virtual machines are automatically identified as being eligible to be reclaimed by analyzing contractual obligations and legal holds associated with the first entity.

\* \* \* \* \*